United States Patent
Holzwarth et al.

(10) Patent No.: US 6,724,788 B1
(45) Date of Patent: Apr. 20, 2004

(54) METHOD AND DEVICE FOR GENERATING RADIATION WITH STABILIZED FREQUENCY

(75) Inventors: Ronald Holzwarth, Backnang (DE); Theodor W. Hänsch, München (DE)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 0 days.

(21) Appl. No.: 09/655,551

(22) Filed: Sep. 6, 2000

(51) Int. Cl.$^7$ ................................................ H01S 3/13
(52) U.S. Cl. ........................... 372/32; 372/21; 372/25; 372/28
(58) Field of Search ............................. 372/21, 28, 32, 372/25

(56) References Cited

U.S. PATENT DOCUMENTS

| | | | |
|---|---|---|---|
| 3,676,796 A | | 7/1972 | Weber |
| 4,815,085 A | | 3/1989 | Javan |
| 5,212,698 A | | 5/1993 | Kafka et al. |
| 5,235,605 A | | 8/1993 | Rines et al. |
| 5,451,910 A | * | 9/1995 | Guthrie ........................ 331/16 |
| 5,970,076 A | * | 10/1999 | Hamada ....................... 372/20 |
| 6,008,931 A | * | 12/1999 | von Helmolt et al. ....... 359/326 |
| 6,034,976 A | * | 3/2000 | Mossberg et al. ............. 372/32 |
| 6,104,764 A | * | 8/2000 | Ohta et al. ................... 375/332 |
| 6,122,087 A | * | 9/2000 | Nogiwa et al. .............. 359/187 |
| 6,201,638 B1 | * | 3/2001 | Hall et al. ................... 359/346 |
| 6,289,028 B1 | * | 9/2001 | Munks et al. .................. 372/20 |
| 6,291,813 B1 | * | 9/2001 | Ackerman et al. ........... 250/214 |

OTHER PUBLICATIONS

T. A. Birks et al. "Supercontinuum generation in tapered fibers", *Optics Letters,* Oct. 1, 2000, vol. 25, No. 19, pp. 1415–1417.

J. K. Randa et al. "Optical properties of high–delta air–silica microstructure optical fibers", *Optics Letters,* Jun. 1, 2000, vol. 25, No. 11, pp. 796–798.

J. K. Ranka et al. "Visible continuum generation in air–silica microstructure optical fibers with anomalous dispersion 800 nm",*Optics Letters,* Jan. 1, 2000, vol. 25, No. 1, pp. 25–27.

W. J. Wadsworth et al. "Soliton Effects and Supercontinuum Generation in Photonic Crystal Fibres at 850 nm", *LEOS,* 1999, Paper PD 1.5, pp. 1–2.

J. C. Knight et al. "All–silica single–mode optical fiber with photonic crystal cladding", *Optics Letters,* Apr. 8, 1996, vol. 21, No. 19 pp. 1547–1549.

J. C. Knight et al. "All–silica single–mode optical fiber with photonic crystal claddding: errata", *Optics Letters,* Apr. 1, 1997, vol. 22, No. 7 pp. 484–485.

T. A. Birks et al. "Endlessly single–mode photonic crystal fiber", *Optics Letters,* Jul. 1, 1997, vol. 22, No. 13, pp. 961–963.

(List continued on next page.)

*Primary Examiner*—David Porta
*Assistant Examiner*—Davienne Monbleau
(74) *Attorney, Agent, or Firm*—Piper Rudnick LLP

(57) ABSTRACT

A method for generating radiation with stabilized frequency, comprises the steps of providing laser light pulses with a repetition frequency $f_R$, said pulses comprising a plurality of N frequency components $f_n$ with $f_n = n\, f_R + f_0$, wherein $f_0$ represents an offset frequency with $n = 1, \ldots, N$, said frequency components forming a comb with first and second different frequency portions, and generating a primary light output with at least one output frequency component corresponding to the difference of frequencies of said first and second frequency portions.

21 Claims, 1 Drawing Sheet

OTHER PUBLICATIONS

D. Mogilevtsev et al. "Group–velocity dispersion in photonic crystal fibers", *Optics Letters,* Nov. 1, 1998, vol. 23, No. 21, pp. 1662–1664.

A. Apolonski et al. "Controlling the Phase Evolution of Few–Cycle Light Pulses", *Physical Review Letters,* Jul. 24, 2000, vol. 85, No. 4, pp. 740–743.

M. Niering et al. "Measurement of Hydrogen 1S–2S Transition Frequency by Phase Coherent Comparison With a Microwave Cesium Fountain Clock", *Physical Review Letters,* Jun. 12, 2000, vol. 84, No. 24, pp. 5496–5499.

R. Holzwarth et al. "Optical Frequency Synthesizer for Precision Spectroscopy", *Physical Review Letters,* Sep. 11, 2000, vol. 85, No. 11 pp. 2264–2267.

T. Udem et al. "Accurate measurement of large optical frequency differences with a mode–locked laser", *Optics Letters,* Jul. 1, 1999, vol. 24, No. 13, pp. 881–883.

S. A. Diddams et al. "Direct Link between Microwave and Optical Frequencies with a 300 THz Femtosecond Laser Comb", *Physical Review Letters,* May 29, 2000 vol. 84, No. 22, pp. 5102–5105.

J. Reichert et al. "Phase Coherent Vacuum–Ultraviolet to Radio Frequency Comparison with a Mode–Locked Laser", *Physical Review Letters,* Apr. 10, 2000, vol. 84, No. 15, pp. 3232–3235.

T. Udem et al. "Absolute Optical Frequency Measurement of the Cesium D1 Line with a Mode–Locked Laser", *Physical Review Letters,* May 3, 1999, vol. 82, No. 18, pp. 3568–3571.

J. Reichert et al. "Measuring the frequency of light with mode–locked lasers", *Optics Communications,* Dec. 15, 1999, pp. 59–68.

J. Ye et al. "Precision phase control control of an ultrawide–bandwidth femtosecond laser: a network of ultrastable frequency marks across the visible spectrum", *Optics Letters,* Nov. 15, 2000, vol. 25, No. 22, pp. 1675–1677.

J. Ye et al. "Accuracy Comparison of Absolute Optical Frequency Measurement between Harmonic–Generation Synthesis and a Frequency–Division Femtosecond Comb", *Physical Review Letters,* Oct. 30, 2000, vol. 85, No. 18, pp. 3797–3800.

D. J. Jones et al. "Carrier–Envelope Phase Control of Femtosecond Mode–Locked Lasers and Direct Optical Frequency Synthesis" *Science,* Apr. 28, 2000, vol. 228, pp. 635–639.

H. R. Telle et al. "Carrier–envelope offset phase control: A novel concept for absolute optical frequency measurement and ultrashort pulse generation", *Applied Physics B,* Sep. 8, 1999, vol. 69, pp. 327–332.

A. Bartels et al. "Femtosecond Ti:sapphire ring laser with a 2–Ghz repetition rate and its application in time–resolved spectroscopy" *Optics Letters,* Jul. 15, 1999, vol. 24, No. 14, pp. 996–998.

D. J. Jones et al. "Frequency comb generation using femtosecond pulses and cross–phase modulation in optical fiber at arbitrary center frequencies" *Optics Letters,* Mar. 1, 2000, vol. 25, No. 5, pp. 308–310.

S. A. Diddams et al. "Optical frequency measurement across a 104–THz gap with a femtosecond laser frequency comb" *Optics Letters,* Feb. 1, 2000, vol. 25, No. 3, pp. 186–188.

S. Backus et al. "High power ultrafast lasers" *Review of Scientific Instruments,* Mar. 1998, vol. 69, No. 3, pp. 1207–1223.

Y. G. Basov "Femtosecond radiation pulses from solid–state lasers", *J. Opt. Technol.,* Jan. 1997, vol. 64, No. 1, pp. 3–14.

S. Uemura et al. "Operation of a femtosecond Cr:LiSAF solitary laser near zero group–delay dispersion", *Optics Communications,* Jan. 1, 1997, vol. 133, pp. 201–204.

L. Xu et al. "Route to phase control of ultrashort light pulses", *Optics Letters,* Dec. 15, 1996, vol. 1, No. 24, pp. 2008–2010.

T. R. Nelson et al. "Short–pulse amplification at 745 nm in Ti:sapphire with a continuously tunable regenerative amplifer", *Applied Optics,* Oct. 20, 1997, vol. 36, No. 30, pp. 7752–7755.

S.N. Bagayev et al., *A Femtosecond Self–Mode–Locked Ti:Sapphire Laser with High Stability of Pulse–Repetition Frequency and its Applications,* Applied Physics B 70, 375–378 (2000).

\* cited by examiner

US 6,724,788 B1

METHOD AND DEVICE FOR GENERATING RADIATION WITH STABILIZED FREQUENCY

FIELD OF THE INVENTION

The invention relates to a method for generating radiation with stabilized frequency, in particular a method for generating stabilized frequencies in the range from radio frequencies up to optical frequencies, and to a device for generating radiation with stabilized frequency, e.g. a stabilized laser generator.

TECHNICAL BACKGROUND

The generation of short light pulses (typical pulse widths in the range down to ps or fs) with laser sources is generally known for many years. As an example, light pulses are generated by locking of oscillation modes of the light field in the laser resonator (mode locking). The light pulses are emitted as a periodic pulse train with a pulse-pulse-distance or repetition time $T=f_R^{-1}$ (see FIG. 1). The repetition time is determined by the length L of the laser cavity and the mean group velocity of the pulses $V_{gr}$ according to $T=2L/V_{gr}$. The consideration of the pulses in the frequency domain yields a frequency comb with a mode structure illustrated in the lower part of FIG. 1. The frequency comb comprises a series of frequency components according to the number of oscillation modes contributing to the pulse formation. The distance of the frequency components equals the repetition frequency $f_R$.

Due to the difference between the phase velocity of the single frequency components and the group velocity associated with the pulses, a phase shift $\Delta\phi$ appears causing a shift of the absolute frequencies $f_N$ of the components according to $f_N=n\ f_R+f_0$ with $f_0=\Delta\phi/T2\pi$. The repetition frequency $f_R$ and the offset or slip frequency $f_0$ represent two degrees of freedom of the frequency comb.

For current applications of laser light, in particular ultrashort light pulses, e.g. in the fields of spectroscopy, telecommunication and time measurement, highly stabilized optical frequencies and pulse parameters are required. While the repetition frequency $f_R$ can be measured and controlled by adjusting the cavity length of the laser resonator, offset frequency $f_0$ requires particular control techniques.

T. Udem et al. ("Phys. Rev. Lett.", vol. 82, 1999, p. 3568) disclose the stabilization of frequency combs by introducing a linear dispersion into the resonator. This technique allowing a control and stabilization of the offset frequency $f_0$, suffers from the following disadvantage. The control of the first order dispersion in the cavity requires a sensitive measurement and adjustment system which is difficult to be handled under practical conditions, e.g. in a routine spectroscopic measurement arrangement or in a pulse source for telecommunication applications.

SUMMARY OF INVENTION

The object of the invention is to provide an improved method for generating radiation with stabilized frequency.

It is another object of the invention to provide an improved radiation source for generating radiation with stabilized frequency, e.g. a stabilized laser light or microwave generator.

The method for generating radiation with stabilized frequency comprises the steps of providing laser light pulses with a repetition frequency $f_R$, the pulses comprising a plurality of N frequency components $f_n$ with $f_n=n\cdot f_n+f_0$, wherein $f_0$ represents an offset frequency with n=1, . . . , N, the frequency components forming a comb with first and second different frequency portions, and generating a primary light output with at least one output frequency component corresponding to the difference of frequencies of the first and second frequency portions According to one embodiment of the invention, the first and second different frequency portions are delivered directly to a difference frequency generator. According to another embodiment, a method for generating radiation with stabilized frequency is provided, wherein the laser light pulses with a repetition frequency $f_R$ are subjected to a frequency filter device transmitting radiation comprising first and second filtered portions corresponding to different first and second frequency intervals $\delta f_1$, $\delta f_2$, each of the filtered portions comprising at least one frequency component $f_{N,1}$, $f_{n,2}$, and the primary light output with at least one output frequency component is generated corresponding to the difference of frequencies of the first and second filtered portions.

The laser light pulses comprise a plurality of N frequency components $f_n$ with $f_n=n\ f_R+f_0$, wherein $f_0$ represents an offset frequency with n=1, . . . , N. The laser pulses can be produced by any available pulse laser. Preferably, the pulses have a mean pulse width in the range of 10 ps to 10 fs or lower and a repetition frequency $f_R$ in the range of 20 MHz to 3 GHz. The primary light output is generated using a non-linear difference frequency generation process being known as such. For obtaining a primary light output with sufficient output power, each of the first and second filtered portions comprise a plurality of frequency components with N=1000 or higher, However, the invention can be implemented with smaller N-values, even with N=1, if cw lasers are phase locked to single frequency modes of the laser pulses (see below) and the frequency difference of the cw laser outputs is provided as the primary light output and/or if the Signal/Noise-Ratio is sufficient high.

An essential advantage of the invention is presented by the fact that the primary light output comprises at least one frequency component or up to M frequency components $f_m$ with $f_m=m\ f_R$ with m=1, . . . , M. The frequency component (s) (or a mean frequency) are independent of the offset frequency. The non-linear frequency difference process eliminated the offset frequency which is contained in both first and second filtered portions of the laser light pulses. Furthermore, the frequency components $f_m$ can be completely adjusted by controlling the repetition frequency of the pulse laser only.

According to a preferred embodiment of the invention, the laser pulses are subjected to non-linear self phase modulation before the filtering for broadening the frequency comb corresponding to the pulses. The broadening preferably is obtained by transmitting said laser light pulses through a non-linear optical element producing further frequency modes, as e.g. an optical fiber. Optical fibers with a strong comb broadening, as photonic crystal fibers (see D. Mogilevtsev et al. in "Optics Letters", vol. 23, 1998, p. 1662, T. A. Birks in "Optics Letters", vol. 22, 1997, p. 961, or T. A. Birks in "IEEE Photonics Letters", vol. 11, 1999, p. 674), are preferably used.

Another subject of the invention is the provision of a radiation source device for generating radiation with stabilized frequency, the radiation source device comprising in particular a laser pulse generator for generating the laser light pulses with a repetition frequency $f_R$, optionally a frequency filtering device for providing the first and second filtered portions, and a non-linear difference frequency generator being adapted to generate a primary light output with at least one output frequency component corresponding to the difference of frequencies of the first and second frequency portions or filtered portions.

According to a preferred embodiment of the radiation source device, a pulse broadening device (e.g. an optical fiber) is arranged between the laser pulse generator and the frequency filtering device.

According to a further preferred embodiment of the invention, a laser or a microwave generator is phase-locked to the primary light output for generating a secondary light output with a stabilized optical or rf frequency, respectively.

A particularly important advantage of the invention results from the broad application range of the generated primary light output. Depending on the laser light pulse width, the first and second filtered portions may have a high frequency distance ranging up to optical frequencies, or a small frequency distance corresponding to radio frequencies, The radiation source device provides an universal frequency generator for a series of applications in time/frequency measurements (e.g. spectroscopy) and in telecommunications.

The invention has the following further advantages. The radiation source device according to the invention has a compact and robust design allowing an easy adjustment and applications under routine conditions. The radiation source device is compatible with conventional laser optical beam forming and measurement techniques.

BRIEF DESCRIPTION OF THE DRAWINGS

Further details and advantages of the invention can be derived from the description of the appended drawings. These show.

DETAILED DESCRIPTION

The basic principles of the invention are illustrated hereinafter without restriction to the described optical components. Implementation with modified pulse sources, filters and non-linear components is also possible by analogy.

Figure 1:
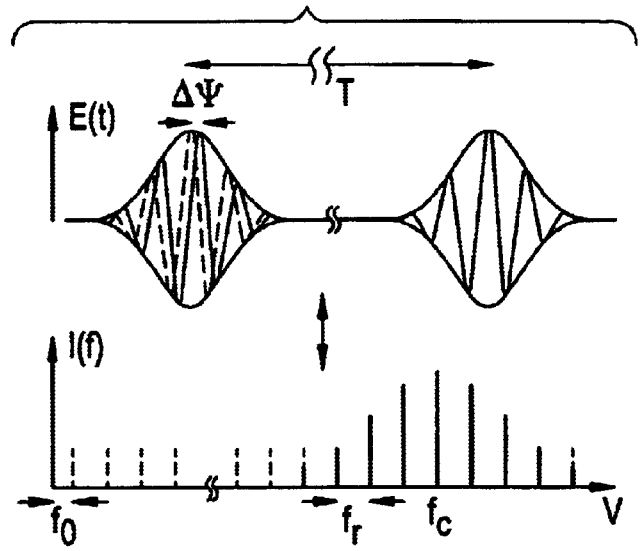
FIG. 1 a schematic representation of laser pulses in the time and frequency domain, FIG. 2 a schematic view of the radiation source device with a primary light output according to one embodiment of the invention, and FIG. 3 a schematic view of a stabilized radiation source device with a primary and a secondary light output according to another embodiment of the invention.

An essential feature of the invention is the provision of ultra-short light pulses which are illustrated in FIG. 1 (see above). These pulses are generated with a laser pulse generator being a part of the radiation source device as shown in FIG. 2 or being an independent component in a measurement arrangement or the like.

Figure 2:
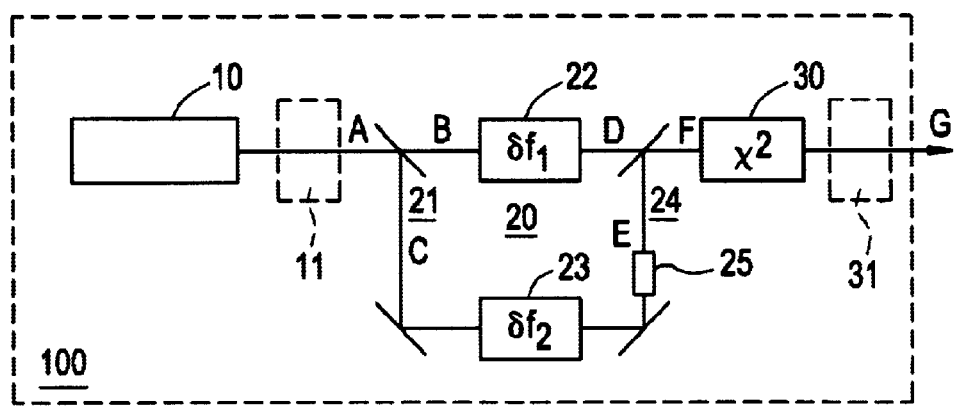

FIG. 2 illustrates the radiation source device 100 according to the invention comprising the laser pulse generator 10, the filtering device 20 and the difference frequency generator 30. The laser pulse generator 10 comprises any conventional pulse laser, e.g. a dye laser a gas laser or a solid state laser. According to preferred embodiments, the laser pulse generator 10 is a Titan-Sapphire-Laser (Ti:Al$_2$O$_3$-crystal, mode-locked with a Kerr-lens, as "Coherent Mira 900", pulse width 73 fs, repetition frequency f$_R$=75 MHz, or a corresponding ring laser, f$_R$=1 GHz, pumped with a diode pumped Nd:YVO$_4$-Laser, as "Coherent Verdi", frequency doubled, λ=532 nm, power: 5 W) or a diode pumped Chrom-Li-SAF-laser.

The output laser pulses (A) of the laser generator 10 are directed to the difference frequency generator 30 directly or via a filtering device 20. In the illustrated embodiment, the filtering device 20 comprises first beam splitter means 21 separating the laser pulses (A) into two branches (B, C), two optical filters 22, 23 each transmitting a first and a second filtered portion (D, E), respectively, and second beam splitter means 24 emerging from the first and second filtered pulse portions (D, E) and passing the optical filters 22, 23 into a common beam (F). One or both of the branches contains an optical delay line 25 for adjusting the time relationship (adapting the time overlap) between the first and second filtered pulse portions. Both portions are superimposed so that they have an identical time position in the common collinear beam (F).

The beam splitter means are formed by semi-transmissive mirrors or prisms. In the branches B and C, further band edge filters may be provided. The optical filters 22, 23 comprise interference filters having predetermined transmission characteristics δf$_{1,2}$ which are separated from each other by a frequency interval defining the wavelength of the primary radiation output (see below).

The filtering device 20 alternatively can be formed by a diffraction device, e.g. an optical diffraction grating, directing different frequency components of the laser pulses to different directions. In this case, the filtered portions are combined by mirrors or prisms.

According to another preferred alternative, the filtering device 20 is formed with a combination of at least one frequency selective (dichroic) mirror corresponding to the first mirror of the first beam splitter means 21 and/or corresponding to the upper mirror of the second beam splitter means 24 (FIG. 1) and further deflection mirrors. In this configuration, filters 22, 23 (FIG. 1) can be omitted so that increased power can be combined at the difference frequency generator 30 resulting in an improved efficiency.

According to another alternative, the filtering device 20 is formed by a combination of two narrow band cw lasers each of which being phase locked to different frequency modes in the separated intervalls δf$_{1,2}$ of the output pulses. In this configuration, the output beams of the cw lasers are directed as beam F to the difference frequency generator 30 using at least one dichroic mirror, The filtered portions of the laser pulses are directed to the difference frequency generator 30 for generating a primary light output (G) with at least one output frequency component corresponding to the difference of frequencies of said first and second filtered portions. The difference frequency generator 30 comprises a non-linear optical crystal (e.g. KTP, periodically poled KTP, BBO or a periodically poled LiNb crystal or any other optically non-linear crystal). The techniques of positioning and adjusting the crystal for the generation of difference frequencies are known as such.

According to an alternative embodiment of the invention, the non-linear crystal of the difference frequency generator 30 is arranged in an external resonator for enhancing the efficiency of the difference frequency generation. The efficiency enhancing technique is known as such from the art of optical parametric oscillators.

The transmission or diffraction characteristics δf$_{1,2}$ of the filtering device 20 each have a mean optical frequency. Both mean frequencies are separated from each other by a frequency interval δf. For a certain mode number intervals δn$_1$ and $\delta n_2$, components of the first and second filtered portions $f_{n,1}=n_1 \, f_R+f_0$ and $f_{n,2}=n_2 \, f_R+f_0$ are contained in the transmission or diffraction characteristics $\delta f_{1,2}$. The primary light output (G) has frequency components $f_{m,out}$ according to $$f_{m,out}=n_1 \cdot f_n+f_0-(n_2 \cdot f_R+f_0) = (n_1-n_2) \cdot f_R = m \cdot g_R$$

The frequency components form a frequency mode comb like each of the output laser pulses. The mean frequency of the pulse-shaped primary light output (G) corresponds to the fixed frequency interval $\Delta f$. Accordingly, an absolute frequency standard is provided which can be used for any subsequent measurement or telecommunication application.

As an example, a high frequency mode of the puls comb has a frequency of 493 THz (corresponding to 603 nm) and a low frequency mode has a frequency of 300 THz. According to the difference frequency formation of the invention, an absolute frequency of 193 THz is provided corresponding to a wavelength of 1550 nm which is used in telecommunication applications.

FIG. 2 shows a pulse broadening device 11 (broken lines) which is preferably implemented for generating stabilized optical pulses. In this case, the frequency interval $\Delta f$ can be comparable with an optical frequency in the THz range. For broadening the mode comb, the pulses of the laser 10 are broadened. Preferably, the pulse broadening device 11 is an optical fiber, e.g. a microstructured fiber as known from the publications cited above.

According to an alternative embodiment of the invention, the output laser pulses (A) of the laser generator 10 are directed to the difference frequency generator 30 directly. In this case, the process of difference frequency generation itself acts as a filter. The difference frequency is generated only for those input frequencies for which the phase matching conditions as known in the art of difference frequency generation are fulfilled.

Due to the selection of filtered portions and the non-linear frequency difference process, the output intensity of the primary light output (G) could be relatively low. For an adaptation to practical requirements, a pulse amplifier 31 (e.g. a fiber amplifier) and/or a coupling of the primary light output (G) with a radiation source may be provided. The generation of an amplified and stabilized secondary light output (H) is illustrated in FIG. 3.

Figure 3:
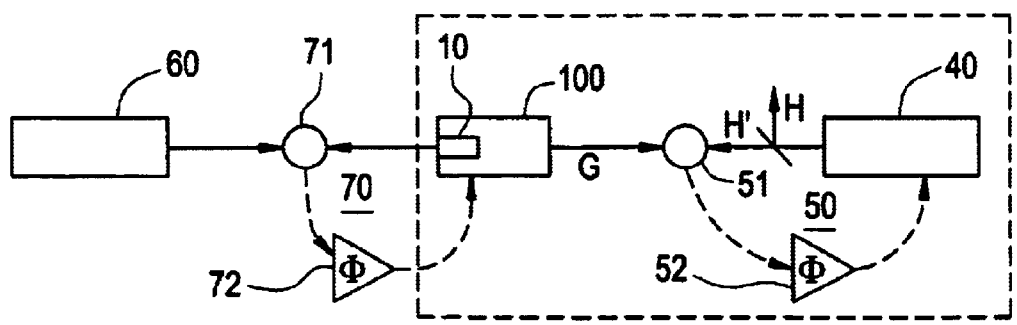

FIG. 3 shows schematically the radiation source device 100 coupled with a radiation generator 40, which is adapted to emit a radiation with a frequency according to the mean frequency of the primary light output (G) or higher multiples thereof. As an example, the radiation generator 40 is an optical cw-laser, an IR laser or a microwave generator.

The output frequency of the radiation generator 40 may be stabilized for providing secondary light output (H) on the basis of the principles described in the PCT application PCT/EP00/02135. With regard to the frequency locking of radiation sources, PCT application PCT/EP00/02135 is incorporated herein by reference. The basic features of a (first) control loop 50 comprising a radiation detector 51 and an amplifier 52 are shown in FIG. 3. Depending on the frequency of the primary light output (G), the radiation detector 51 is a photodiode (or photomultiplier or the like) or an antenna. The primary light output (G) of the generator 40 and the output H' of the generator 10 are simultaneously detected by the radiation detector 51 which forms an electrical signal according to the detected radiation. If both components have a slight frequency difference, a beat signal with a heterodyne frequency is generated. If the beat signal is stabilized to zero or a predetermined offset frequency, the generator 40 is phase locked to at least one standard frequency mode $f_m$ of the primary light output (G) yielding the secondary light output (H) with a precisely known frequency.

The structure comprising the radiation source device 100 combined with the radiation generator 40 (marked with a dashed line) provides amplified secondary output radiation. Further stabilization is obtained if the pulse laser 10 of the radiation source device 100 is stabilized with a stabilization circuit as shown in the left part of FIG. 3.

The stabilization circuit comprises a reference frequency generator 60 and a (second) control loop 70 comprising a radiation detector 11 and an amplifier 72. Depending on the frequency of the reference frequency generator 60, the radiation detector 71 is a light-sensitive element (e.g. photodiode or photogiultiplier or the like) or a combination of a light-sensitive element with a mixer stage. The reference frequency signal emitted by the reference frequency generator 60 and the primary output pulses of the pulse laser 10 (corresponding to output G in FIG. 2) are simultaneously detected by the radiation detector 71 which fores an electrical signal containing a beat signal with a heterodyne frequency if both components have a slight frequency difference. If the beat signal is stabilized to zero or a predetermined offset frequency, the pulse laser 10 is phase locked to the reference frequency yielding a secondary light output (H) having a frequency stability as high as the frequency stability of the reference frequency generator 60. The absolute frequency of the secondary light output (H) is determined by the repetition rate $f_n$ of the pulse laser which is controlled (controlling of the cavity length or electro-optical controlling) relative to the reference frequency generator 60. The dependency of the absolute frequency of the secondary light output (H) on one parameter only (namely the repetition rate $f_n$ of the pulse laser) represents an essential advantage of the invention.

Depending on the application, the reference frequency generator 60 is a microwave generator, an optical spectroscopy reference cell or an optical reference laser. In the first case, the repetition frequency of the pulse laser 10 is phase-locked with a stabilized microwave frequency. In the second case, an optical transition is excited in the reference cell (e.g. an temperature stabilized I- or Rb-vapor cell) and the repetition frequency of the pulse laser 10 is phase-locked with a fluorescence frequency of the optical transition. Finally, in the third case, the pulse laser repetition frequency is phase-locked with an output frequency of an stabilized cw laser.

What is claimed is:

1. Method for generating radiation with stabilized frequency, comprising the steps of:

providing laser light pulses with a repetition frequency $f_R$, said pulses being generated with a mode-locked laser pulse generator and comprising a plurality of N frequency components $f_n$ with $f_n=n \ast f_R+f_O$, wherein $f_O$ represents an offset frequency, said frequency components forming a comb with first and second different frequency portions $f_{n,1}=n_1\ast f_R+f_O$ and $f_{n,2}=n_2\ast f_R+f_O$, respectively, with n, $n_1$, $n_2$=1, . . . , N, wherein each frequency component of said first and second frequency portions contains said offset frequency $f_O$, and generating a primary light output with a non-linear optical component generating a plurality of frequency components $f_{m,out}=n_1 \ast f_R+f_O-(n_2\ast f_R+f_O)=(n_1-n_2)\ast f_R$ corresponding to the difference of frequencies of said first and second frequency portions, said plurality of frequency components forming an output frequency comb, wherein said offset frequency is eliminated from said frequency output comb.

2. Method according to claim 1, wherein said laser light pulses are delivered directly on said non-linear optical component.

3. Method according to claim 1, further comprising the steps of:
   filtering said laser light pulses with a frequency filter device transmitting radiation comprising a first filtered portion in a first frequency interval $\delta f_1$, and a second filtered portion in a second frequency interval $\delta f_2$, according to said first and second frequency portions, respectively, each of said filtered portions comprising at least one frequency component $f_{n,1}$, $f_{n,2}$,
   recombining said first and second filtered portions and directing the recombined portions on sad non-linear optical component.

4. Method according to claim 1, wherein said laser light pulses are subjected to a pulse broadening.

5. Method according to claim 4, wherein said pulse broadening is obtained by transmitting said laser light pulses through an optical fibre.

6. Method according to claim 1, wherein said output frequency component of said primary light output corresponds to the frequency of an optical wavelength or a wavelength of microwaves.

7. Method according to claim 1, wherein a laser device is phase coupled to said primary light output, so that the laser device generates a secondary light output with a stabilized optical frequency.

8. Method according to claim 1, wherein a microwave generator is phase coupled to said primary light output, so that the microwave generator generates a secondary radiation output with a stabilized microwave frequency.

9. Method according to claim 1, wherein said laser light pulses are stabilized by phase coupling with a reference frequency generator.

10. Radiation source device for generating radiation with stabilized frequency, comprising:
   a mode-locked laser pulse generator for generating pulses with a repetition frequency $f_R$, said pulses comprising a plurality of N frequency components $f_n$ with $f_o = n*f_R + f_O$, wherein $f_O$ represents an offset frequency, said frequency components forming a comb with first and second different frequency portions $f_{n,1} = n_1*f_R + f_O$ and $f_{n,2} = n_2*f_R + f_O$, respectively, with n, $n_1$, $n_2$ = 1, . . . , N, wherein each frequency component of said first and second frequency portions contains said offset frequency $f_O$, and
   a difference frequency generator comprising a non-linear optical component generating a primary light output with a plurality of frequency component $f_m = n_1*f_R + f_O - (n_2*f_R + f_O) = (n_1 - n_2)*f_R$ corresponding to the difference of frequencies of said first and second frequency portions, said plurality of frequency components forming output frequency comb, wherein said offset frequency is eliminated from said output frequency comb.

11. Radiation source device according to claim 11, further comprising:
   a frequency filtering device for transmitting radiation comprising a first filtered portion of said pulses in a first frequency interval $\delta f_1$, and a second filtered portion of said pulses in a second frequency interval $\delta f_2$, according to said first and second frequency portions, respectively, each of said filtered portions comprising at least one frequency component $f_{n,1}$, $f_{n,2}$, and
   a time delay line for adapting the time overlap said first and second filtered portions before said difference frequency generator.

12. Radiation source device according to claim 10, further comprising a pulse broadening device being arranged at output of said laser pulse generator.

13. Radiation source device according to claim 12, wherein said pulse broadening device comprises an optical fibre.

14. Radiation source device according to claim 11, wherein said frequency filtering device comprises at least two optical filters, a mirror arrangement with at least one dichroic semi-transmissive mirror or a diffraction device.

15. Radiation source device according to claim 10, wherein said difference frequency generator comprises a non-linear optical component.

16. Radiation source device according to claim 15, wherein said non-linear optical component is arranged in an external resonator for enhancing the efficiency of the difference frequency generation.

17. Radiation source device according to claim 10, further comprising a laser device being phase coupled to said primary light output of said difference frequency generator, so that the laser device generates a secondary light output with a stabilized optical frequency.

18. Radiation source device according to claim 10, further comprising a microwave generator being phase coupled to said primary light output of said difference frequency generator, so that the microwave generator generates a secondary radiation output with a stabilized microwave frequency.

19. Radiation source device according to claim 10, wherein said laser pulse generator is stabilized with a reference frequency generator.

20. Radiation source device according to claim 19, wherein said reference frequency generator is a microwave generator, an optical spectroscopy reference cell or an optical reference laser.

21. A radiation source comprising:
   a laser pulse generator;
   first and second beam splitters;
   first and second optical filters; and,
   difference frequency generator,
   wherein each pulse produced by the laser pulse generator comprises at least first and second frequency components, said first and second frequency components being separated by the first beam splitter, the first frequency component being filtered by the first optical filter to produce a first filtered frequency component, and the second frequency component being filtered by the second optical filter to produce a second filtered frequency component, and
   wherein the first and second filtered frequency components are recombined by the second beam splitter to form a recombined pulse, each said recombined pulse being applied to the difference frequency generator to generate a primary light output.

* * * * *